Nov. 15, 1960  J. W. McFARLANE  2,960,267
FILTER COMPUTER
Filed Aug. 23, 1956  3 Sheets-Sheet 1

JOHN W McFARLANE
INVENTOR.

Nov. 15, 1960  J. W. McFARLANE  2,960,267
FILTER COMPUTER
Filed Aug. 23, 1956  3 Sheets-Sheet 2
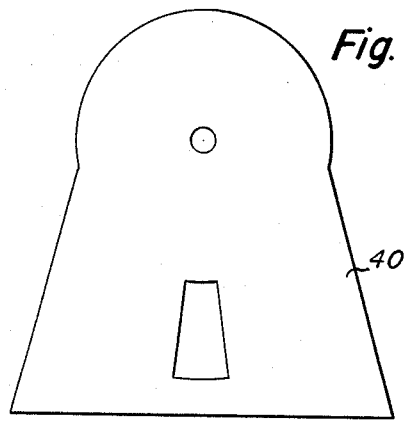
Fig. 5
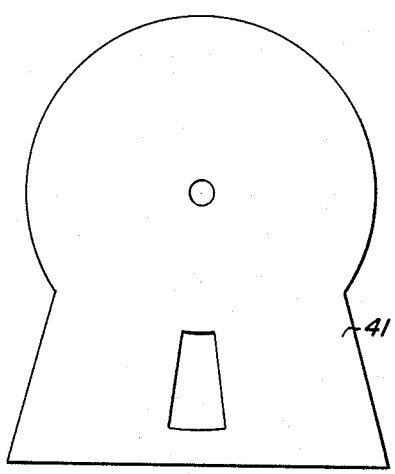
Fig. 6
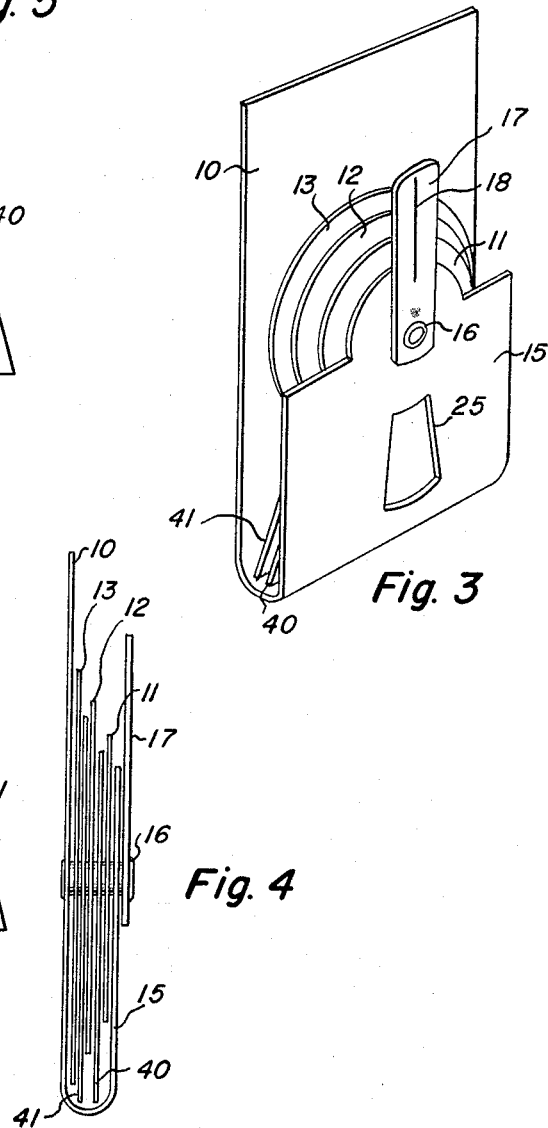
Fig. 3
Fig. 4
JOHN W. McFARLANE
INVENTOR.
BY
ATTORNEYS Nov. 15, 1960

J. W. McFARLANE 2,960,267

FILTER COMPUTER

Filed Aug. 23, 1956

JOHN W. McFARLANE
INVENTOR.

BY

ATTORNEYS

United States Patent Office 2,960,267
Patented Nov. 15, 1960

2,960,267
FILTER COMPUTER

John W. McFarlane, Rochester, N.Y., assignor to Eastman Kodak Company, Rochester, N.Y., a corporation of New Jersey Filed Aug. 23, 1956, Ser. No. 605,844

3 Claims. (Cl. 235—64.7)

This invention relates to color photography and specifically to computers used in making color prints.

The one problem which causes the most concern to the amateur or professional photographer making color prints is the question of color balance. There are, of course, other sources of possible errors in color photographic processes, but these have to be corrected either in the manufacture of the photographic material or by complex procedures not normally utilized in making direct prints. The question of correct color balance, however, comes up everytime a print is made and the photographer can do something about this particular problem.

The present invention is not concerned with the particular method used for determining proper color balance. For example, it is common practice to use certain color filters when making a color print either from a color negative or by reversal from a color positive transparency. It is also customary to examine the resultant print through various filters until the print appears to have proper color balance. However, after a decision has been made that a certain print made with certain filters and viewed through other filters does have correct color balance, there still remains for the photographer the problem of selecting the right combination of filters for making a properly balanced print.

The object of the invention is to provide a computer which will simplify this latter problem for the photographer. In fact, without the present computer, the problem is sometimes beyond the ability of the ordinary photographer to make the proper selection, particularly if he does not understand the underlying arithmetic of the problem.

The computer has a number of functions to perform even in the relatively simple case where the photographer has made a reversal print from a positive color transparency and knows one set of filters which will give proper color balance. The purpose of the computer in this case is to select from all of the available combinations which give the same color balance, the fewest filters with a minimum density (i.e. which have no gray component), and which have the lowest possible density for the filter which has the greatest density of those used. The computer determines the minimum number of filters which have to be used. Only two colors should be required in any case and in some cases, only one filter or no filter at all may be required.

The filters normally supplied for this purpose are called Color Correction Filters, abbreviated to "CC Filters." They come in 6 colors, namely, primary red, primary green, primary blue, cyan, magenta and yellow. Also, they are supplied normally in various densities differing by .1 in density plus a very light filter in each color with a density of .05. Some photographers even use a .025 density filter and the effect of such a light filter is appreciable under special circumstances.

As a relatively simple example let us assume that a photographer has found from past experience that the lamp in his printer is somewhat too yellow and that he obtains better results on the average by using a .10 blue filter. Let us further suppose that the manufacturer supplies a type of paper recommending that it be printed through a .05 red and a .10 magenta filter. Let us further suppose that the photographer makes a print on reversal material from a positive transparency and finds that the color balance is off so that the print looks better when viewed through a combination of .30 yellow and .10 cyan. This is a relatively simple case since a reversal print is being made from a positive. This example is chosen merely to illustrate the arithmetic involved; in practice one does not often encounter the need for the viewing filter to be of as high a density as .30. The most satisfactory estimates of print quality are made when only relatively low density filters are involved. The object of the present invention is to select two filters of a minimum density without any gray value which will make a proper print under these circumstances. An example of how this particular problem is solved on the computer will be given following the description of the computer itself.

There are several reasons why the final print should be made with the fewest filters possible and with no neutral density. Flare and light loss from surface reflections increase with the number of filters used. Also departures from correct spectral transmissions become greater with a greater number of filters. Thus for two reasons the number of filters should be a minimum. When neutral density is present, exposure times become objectionably long and, in some cases, reciprocity failure tends to upset the color balance in a way that cannot be corrected by filters.

A somewhat more complicated problem arises in the case of a negative-positive process starting with a color negative transparency. Again there will be a combination of filters recommended by the manufacturer for the particular supply of paper being used and also there may be a filter appropriate to the particular printer. The added complication in a negative-positive process is due to two things. In the first place, the filter used in examining the test print is not the one to use in making subsequent prints; the complementary color must be used to produce the equivalent effect. That is, if the print looks best through a cyan filter, the corresponding red filter must be used in making the test print. Secondly, the gamma or more exactly the overall gradient of the print material must be taken into account when converting from a viewing filter to a printing filter. For example, if the test print looks best through a .20 cyan filter, it would not be proper to use a .20 red filter in making the next print unless the print material happens to have a gradient of 1. Actually in negative-positive processes the print material has an overall gradient about twice that of reversal print materials. Accordingly, in the example just given, .10 red filter should be used in making the next print. The reason for comparing the overall gradient of the negative-positive print material with the overall gradient of the reversal material rather than referring to the absolute value of the overall gradient is the fact that all color prints are made somewhat more contrastly than that represented by an overall gradient value of unity. This additional factor is present in both processes, but the negative-positive print material has a gradient of about twice that of the reversal material.

Obviously the 2:1 ratio just discussed is not fundamentally inherent in such processes. It happens that present day negative-positive print materials have a contrast (over all gradient) almost exactly twice that of present day reversal materials. It is not expected to change but there is no fundamental reason why it should not. On the other hand, the present computer can be made up to match any ratio of gradients.

The invention will be more fully understood from the following description when read in connection with the accompanying drawing in which:

Fig. 3 is a perspective view of this embodiment;

Fig. 4 is a vertical section of this embodiment;

Figs. 5 and 6 show spacers used in this embodiment;

Figure 1:
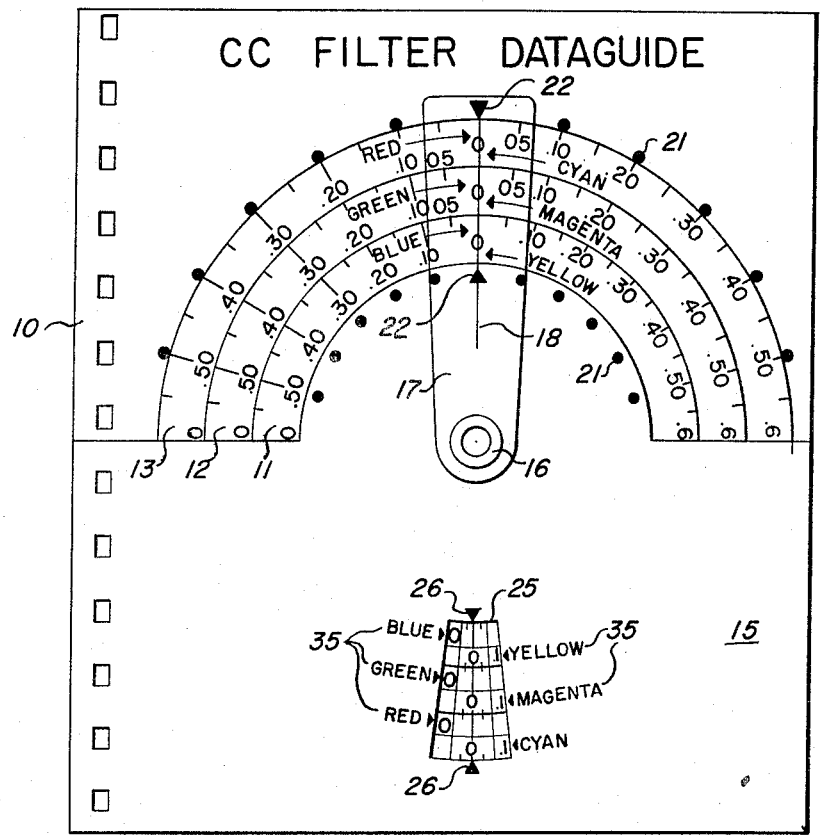
Fig. 1 is a front view of a simple, practical embodiment of the present invention.

In Figs. 1–6 inclusive, a simple form of the invention is shown consisting of a heavy cardboard support 10, preferably laminated to a transparent, plastic sheeting, with a turned up front portion 15. The front portion 15 and all of the movable members and spacers of the computer are held in place by an eyelet 16 which acts as a pivot for discs 11, 12 and 13 and for a transparent index arm 17.

The discs 11, 12 and 13 are successively larger and carry scales, actually 4 scales on each, on or near the periphery of the discs.

These scales operate independently of each other and need not be adjacent to each other. However, there is no harm in having them adjacent and it is convenient to have the discs only slightly different in size. Spacers 40 and 41 are provided between the discs so that movement of one disc will not tend to move the adjacent disc. The spacers 40 and 41 are kept from rotating by the fact that they extend down to the fold in the support 10.

Let us first consider only the two scales on the top of each disc. Disc 11 has a blue scale and a yellow scale; disc 12 a green scale and magenta scale; disc 13 a red scale and cyan scale. In one practical embodiment of the invention the words red, green and blue are respectively printed in red (orange), green and blue (violet) ink. The words cyan, magenta and yellow are printed in black ink but the background for the scales themselves are respectively colored cyan, magenta and yellow. The density increments on these 6 scales are effectively equal to each other.

The scales are parallel to each other. Concentric circles constitute parallel curves. Only concentric circles can move parallel to each other and remain parallel; this statement involves the customary assumption that parallel straight lines are concentric circles with their centers at infinity. Other types of parallel lines such as parallel wavy curves cannot move and remain parallel.

The only cooperation between the three pairs of scales is provided by the rotated arm 17 carrying the index line 18 against which all of the scales are read. The dots 21 on the mount 10 and 15 are not actually used in any of the computations. They merely serve constantly to remind the operator that he is in general working in units of .10 (or perhaps .05) and that each adjustment should be made a whole unit at a time. The instrument will work just as well without the dots 21. Even the small triangular dots 22 serve no real purpose except that it is nice to have some point at which to line up the three scales before starting any computations. Also, in the negative-positive computations discussed later, it is necessary to have the bottom scales properly lined up and one convenient way of doing this is to line up the top scale with respect to the small triangles 22, which like the dots 21 are printed on the supports 10 and 15.

Figure 2:
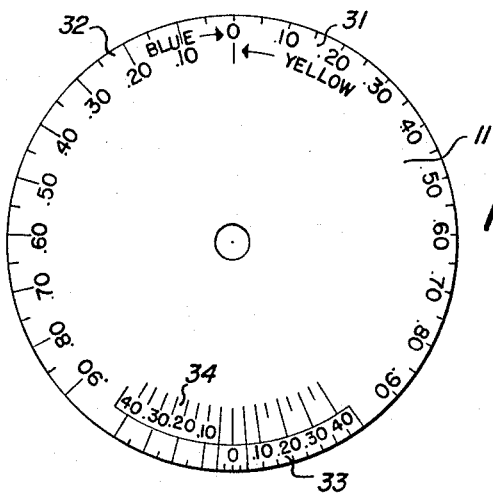
Fig. 2 shows one of the discs used in this embodiment.

In Fig. 2, one of the discs is shown by itself. The yellow scale 31 is, or may be, black lettering and numerals on a yellow background. The blue scale 32, in general, consists of blue letters and black or blue numerals on a white background. The bottom scales 33 and 34 are in general black numerals on yellow and blue (violet) backgrounds respectively. Only the bottom half is colored for scale 33 and only the top half is colored for scale 34 in the most convenient form of the instrument. The labels 35 for the scales appear as black letters on the white part 15 of the support. Alternatively, this part may be black and the lettering white. The scales themselves are viewed through an aperture 25 in the support 15. Corresponding apertures are provided in the spacers 40 and 41 as shown in Figs. 5 and 6. The lower scales 33 and 34 are read against index marks 26 printed on the support 15. The pair of scales (green and magenta) on the lower part of the middle disc 12 are not adjacent to either of the index marks 26, but there is no difficulty in reading these green and magenta scales against these index marks. After all, one does not make any interpolations on any of the scales. For example, one always uses a whole filter and the filters only come in increments of .10 (or perhaps .05). There never is an occasion when one would want to read a density value between .15 and .20 for example. In other words, this computer is used for digital computations simply making additions and subtractions of whole units and it is not used as an analogue computer for intermediate values.

It is repeated that each pair of scales operate quite independently of the other pairs except that all three scales read against the same index mark. They may be separated by large distances if the index mark is long enough.

It should be noted that the scales 33 and 34 have smaller increments than the scales 31 and 32. A .20 density on the scale 33 corresponds to a .10 density on the scale 32. Also, the scale 33 is a yellow scale, and the scale 32 is a blue scale. The scales 33 and 34 are used only in negative-positive processes and are quite unnecessary when making reversal prints from positive transparencies.

Figure 7:
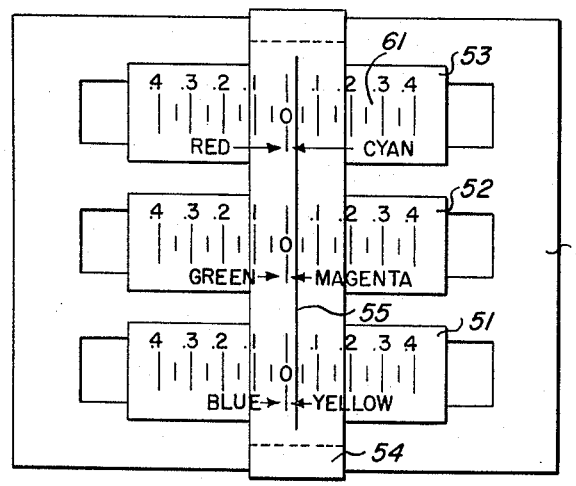
Figs. 7, 8 and 9 are, respectively, front, back and a perspective view of another embodiment of the invention.

A different embodiment of the invention is shown in Figs. 7–10 inclusive. In this embodiment, the support 50 carries parallel scales 51, 52 and 53. As viewed from the front in Fig. 7 these scales correspond to the top scales of Fig. 1. A transparent slide 54 provided with an index line 55 is movable along all three pairs of scales. As before, the 6 scales have effectively equal increments of density and are arranged in complementary pairs. In making reversal prints, only the front of the computer is used as shown in Fig. 7.

Figure 8:
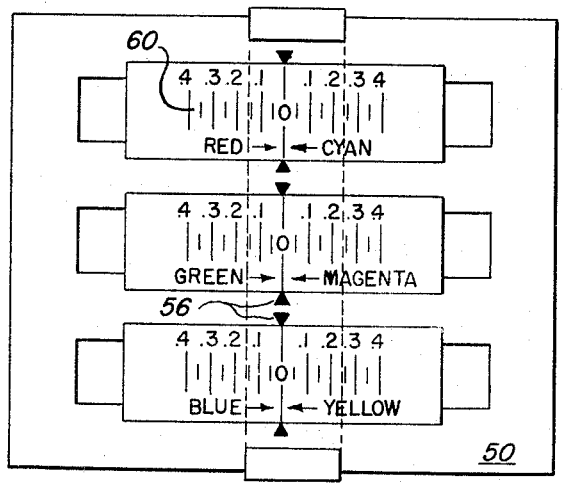
Figure 9:
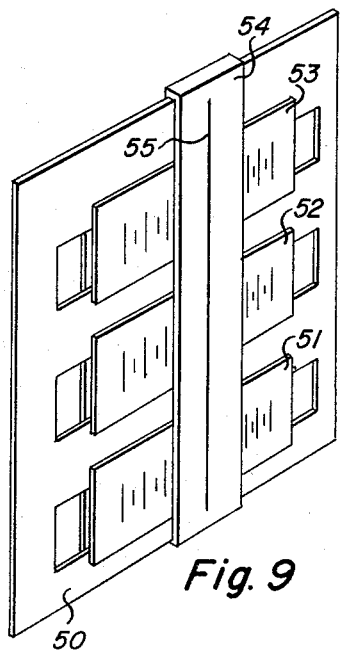
Figure 10:
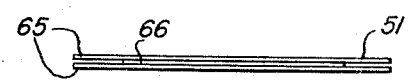
Fig. 10 is a horizontal section of one of the sliding members in the embodiment shown in Figs. 7, 8 and 9.

For negative-positive processes each pair of scales should have associated with it another pair of scales (for viewing filters) and one very convenient way of doing this is to have the scales on the reverse sides as shown in Fig. 8. When the instrument is turned around to see this reverse side, the red scale appears on the left and the cyan scale on the right just as they do on the front. However, this means that they have the opposite effect. Movement on the red scale 60 (relative to index marks 56) moves the scale member 53 to the right in Fig. 8 which means that it moves to the left in Fig. 7, which in turn means that the movement is with respect to the cyan scale 61, as required in negative-positive processes. Furthermore, it will be noted that the scales in Fig. 8, such as scale 60, have smaller increments than the scales in Fig. 7. This allows for the difference in gamma of the print materials used in negative-positive processes and reversal processes. As shown in Fig. 10 each of the scale members such as 51 is made up of two parts 65 and a spacer 66 so that the scale may be slid right to the edge of the support 50, thus permitting as compact an instrument as possible with as large a scale as possible in each case.

The operation of the instrument for both types of color printing will now be described. It is the same for both embodiments, namely, that shown in Fig. 1 and that shown in Fig. 7. The procedure with respect to the simpler process, namely the reversal printing process will be described first. However, when one comes to the negative-positive process it is always necessary to set in the values for the viewing filters first in order to minimize the possibility of errors being made. Accordingly, this same procedure will be used when making the setting for a reversal process although it is not as necessary in this case and although it would seem more natural to set in the values of the printing filters first.

Let us start with the example given as a problem in the introduction to this specification. A test print was made by the reversal process and was found to look properly color balanced through a .30 yellow and a .10 cyan filter combination. Accordingly, with the reference mark 18 (or 55) held fixed, the disc 11 (or slide 51) is moved counterclockwise to "set in" .30 yellow. The disc 13 is moved counterclockwise to set in .10 cyan. It sometimes happens that the photographer keeps adding more filters when viewing the test print and arrives at a final combination with complementary filters included. For example, he might have in a .10 red and .20 cyan instead of just .10 cyan. In this case he would set in .10 red. Then he would move the index 18 back to the zero on the red-cyan scale and set in .20 cyan. In other words, he does not even have to bother subtracting his red from his cyan before using the computer. The computer takes all of these possible variations into account.

Having set in .30 yellow and .10 cyan in the example we are now following, the operator proceeds to set in his printing filters. Starting with scale 11 he moves the index 18 until it is over the zero on this scale and he sets in .10 blue. Then he moves the index to zero on the scale 12 and sets in .10 magenta. Finally he moves the index to zero on the scale 13 and sets in .05 red. He has now accounted for all of the filters used in viewing and in printing. If he sets the index 18 anywhere along the scales 11, 12 and 13 he will have filter values which would give the correct color balance in making a print. However, if he is far to the right or to the left, his filter combination will include large amounts of gray. There will in general be three positions in which the index will fall on one of the three zeros. Two of the positions may coincide, but the general case is considered first. In any of these index positions the computer will indicate that only two filters are needed. However, if he uses the left hand one of these 3 positions he will be including some gray (unless, of course, two of the zeros coincide). The middle setting and the right hand setting and, in fact, any setting between these two settings, will "eliminate gray." Either the middle setting or the right hand setting will require at most two filters whereas positions between the two settings would require three filters. The middle setting has a slight edge over the righthand setting. The total numerical value of the two filters used is the same in the two cases, but the individual values are lower for the middle setting. That is, one of the two filters has a density equal to or greater than the other and for the middle setting this greater value is a minimum.

In the example just given the zero setting for scale 11 is on the left, the zero setting for scale 12 is in the middle and the zero setting for scale 13 is on the right. Accordingly, in the most preferred process the index 18 is placed on the zero setting of the scale 12 and this indicates that the print should be made through a .10 yellow and a .05 red filter. If the index is set at zero on scale 13 one would still get a balanced print using .05 magenta and .15 yellow filters. It will be noticed that a .15 yellow filter is required in this case whereas the highest density in the other case was .10. If the index is set anywhere to the left of the zero setting for scale 12 or anywhere to the right of the zero setting for scale 13 the filter combination thus determined will include some unnecessary gray value which will prolong printing. Also, due to the inefficiency of filter dyes the inefficient settings will introduce an unnecessary source of additional possible errors.

Let us now describe the more complicated system when a print is made on negative-positive material. In this case, the bottom scales in Fig. 1 or the scales on the reverse side of the straight slide embodiment shown in Fig. 8 are used. These scales are read against fixed index marks 26 in Fig. 1 and against fixed index marks 56 in Fig. 8. The values for the viewing filters are set in against these fixed index marks first, without any reference to the upper scales in Fig. 1 (or the front scales in Fig. 7). The setting of the viewing filters is equivalent to a setting of the complementary filters of approximately half the density in the upper scale of Fig. 1 (or the front scale of Fig. 7).

This operation moves the zero of the upper scales or front scales and, accordingly, the sliding index 18 or 55 has to be moved to the zero of each scale before the values for the particular printing filters which were used in making the test print, are set in. After the values for these printing filters are set in on the top scale of Fig. 1 (or the front scale of Fig. 7) the computer is properly set to give the printing filter values for proper color balance. This is true for any setting for the index 18 (or the index 55). However, as before, it is preferable to set the index on the right hand or middle zero preferably the latter so as to do three things, namely, eliminate gray, reduce the number of filters to at most two and thirdly, to use color filters of the lowest density.

As mentioned at the start of this specification this computer relates to processes working with the so-called CC Filters, meaning Color Correction Filters which come in density increments of .10 (except possibly for filters of .05 or even .025). There are no filters above .10 density other than in increments of .10.

Reference is made to the 12 page publication "Instructions for Using the Kodak CC Filter Dataguide" published by the Eastman Kodak Company, July 1956, which also describes the present invention.

I claim:

1. A computer for color filters to be used in making photographic color prints comprising a support, three scale members carried by the support and independently movable parallel to each other, a scale on each member reading linearly in optical density in both directions from a center zero, the three scales having effectively equal increments and respectively having increments representing the three primary colors reading one way from the zero and increments representing the respectively complementary colors reading the other way from the zero, an index fixed on the support relative to which index the the scales may be independently moved, a movable index member with a single index across all three scales cooperating with each of the scales and mounted on the support movable along the scales and relative to the fixed index, a second scale on each scale member remote from the first, a second fixed index carried by the support against which the remote scales may be read, each remote scale having a center zero with increments corresponding to the same pair of complementary colors as the first scale on that member but reversed relative to the zero so that increasing density for one color relative to said second fixed index corresponds, on the first scale, to increasing density for the complementary color relative to the first fixed index, the density increments for the second scales being effectively equal to each other but differing from those of the first scales by a ratio substantially equal to the ratio of the overall gradients of reversal color print material and negative-positive color print material.

2. A computer according to claim 1 in which the scale members are concentric superposed rotatable centrally pivoted discs, the bottom disc being the largest and the upper discs having successively smaller diameters, the parallel scales are concentric arcs near the peripheries of the discs and the movable index member is a radial arm swingable on the same pivot as the discs, and in which the second scales are also near the peripheries of the discs diametrically opposite to the first scales.

3. A computer according to claim 1 in which the density increments for the second scales are effectively equal to each other and one half the effective size of those of the first scales.

References Cited in the file of this patent

UNITED STATES PATENTS

| | | |
|---|---|---|
| 1,145,020 | Hill | July 6, 1915 |
| 1,207,448 | Venable | Dec. 5, 1916 |
| 1,262,635 | Cady | Apr. 16, 1918 |
| 1,329,896 | Frome | Feb. 3, 1920 |
| 1,418,947 | Lysen | June 6, 1922 |
| 1,766,184 | Mills | June 24, 1930 |
| 2,196,271 | Olson | Apr. 9, 1940 |
| 2,477,556 | Shaw | July 26, 1949 |
| 2,597,658 | Mattucci | May 20, 1952 |
| 2,735,618 | Venable | Feb. 21, 1956 |